United States Patent
Yuan et al.

(10) Patent No.: US 9,825,770 B2
(45) Date of Patent: Nov. 21, 2017

(54) METHOD AND APPARATUS FOR CONFIGURING MULTICAST GROUP

(71) Applicant: Telefonaktiebolaget L M Ericsson (publ), Stockholm (SE)

(72) Inventors: Song Yuan, Beijing (CN); Giovanni Mumolo, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 35 days.

(21) Appl. No.: 14/441,771

(22) PCT Filed: Nov. 8, 2012

(86) PCT No.: PCT/CN2012/001509
§ 371 (c)(1),
(2) Date: May 8, 2015

(87) PCT Pub. No.: WO2014/071538
PCT Pub. Date: May 15, 2014

(65) Prior Publication Data
US 2015/0295725 A1    Oct. 15, 2015

(51) Int. Cl.
*H04L 12/24* (2006.01)
*H04L 12/44* (2006.01)
(Continued)

(52) U.S. Cl.
CPC ........... *H04L 12/185* (2013.01); *H04L 45/16* (2013.01); *H04L 45/50* (2013.01)

(58) Field of Classification Search
None
See application file for complete search history.

(56) References Cited

U.S. PATENT DOCUMENTS 7,281,058 B1 * 10/2007 Shepherd ............ H04L 12/1836
                                                    709/227
8,144,628 B2 *  3/2012 Previdi .................. H04L 12/185
                                                    370/256
(Continued)

FOREIGN PATENT DOCUMENTS

CN         101286863 A      10/2008
CN         102238244 A      11/2011
(Continued)

OTHER PUBLICATIONS

International Preliminary Report on Patentability for Application No. PCT/CN2012/001509, mailed May 21, 2015, 6 pages.
(Continued)

*Primary Examiner* — Duc Duong
(74) *Attorney, Agent, or Firm* — Nicholson De Vos Webster & Elliott LLP

(57) ABSTRACT

The embodiments disclose a method and communication node for configuring a multicast group in a Multiple Protocol Label Switching (MPLS) network. The method comprises: obtaining a multicast group configuration request to configure the multicast group of at least one downstream node in the MPLS network, the at least one downstream node may comprise a transit node, a leaf node or the combination thereof; generating a multicast group configuration packet based on the multicast group configuration request; and transmitting the multicast group configuration packet from the root node to the at least one transit node and/or leaf node via a multicast tree in the MPLS network.

12 Claims, 7 Drawing Sheets

(51) Int. Cl.
*H04L 12/751* (2013.01)
*H04L 12/761* (2013.01)
*H04L 12/18* (2006.01)
*H04L 12/723* (2013.01)

(56) References Cited

U.S. PATENT DOCUMENTS

| | | | |
|---|---|---|---|
| 2005/0169266 A1* | 8/2005 | Aggarwal | H04L 12/66 370/389 |
| 2008/0205397 A1 | 8/2008 | Xu | |
| 2008/0219264 A1* | 9/2008 | Wijnands | H04L 45/04 370/392 |
| 2009/0201928 A1* | 8/2009 | Chen | H04L 12/189 370/390 |
| 2009/0232031 A1 | 9/2009 | Vasseur et al. | |
| 2009/0279701 A1* | 11/2009 | Moisand | H04L 12/185 380/270 |
| 2010/0124225 A1* | 5/2010 | Fedyk | H04L 45/02 370/390 |
| 2010/0157788 A1* | 6/2010 | Ellis | H04L 41/064 370/216 |
| 2011/0142042 A1* | 6/2011 | Field | H04L 12/185 370/390 |
| 2011/0202761 A1* | 8/2011 | Sarela | H04L 12/189 713/163 |
| 2011/0280241 A1* | 11/2011 | Field | H04L 12/185 370/390 |
| 2011/0286324 A1* | 11/2011 | Bellagamba | H04L 41/0677 370/219 |
| 2011/0317695 A1* | 12/2011 | Cai | H04L 45/16 370/390 |
| 2013/0010790 A1* | 1/2013 | Shao | H04L 45/16 370/390 |
| 2013/0100953 A1* | 4/2013 | Li | H04L 45/16 370/390 |
| 2013/0329605 A1* | 12/2013 | Nakil | H04L 41/0668 370/255 |
| 2014/0003425 A1* | 1/2014 | Zhao | H04L 12/1836 370/390 |

FOREIGN PATENT DOCUMENTS

| | | |
|---|---|---|
| EP | 0 026 515 A1 | 2/2009 |
| WO | 2011132104 A1 | 10/2011 |

OTHER PUBLICATIONS

International Search Report and Written Opinion for International Application No. PCT/CN2012/001509, mailed Aug. 2013, 10 pages.
Ed. E. Bellagamba et al., "Configuration of pro-active MPLS-TP Operations, Administration, and Maintenance (OAM) Functions Using LSP Ping," draft-ietf-mpls--ping-mpls-tp-oam-conf-01, MPLS Working Group, Mar. 10, 2011, pp. 1-24.
Ed. R. Winter et al., "MPLS-TP Identifiers Following ITU-T Conventions," draft-ietf-mpls-tp-itu-t-identifiers-06, Network Working Group, Nov. 7, 2012, pp. 1-14.
Ed. M. Bocci et al., "MPLS Generic Associated Channel," Network Working Group, Request for Comments: 5586, Jun. 2009, pp. 1-23.
Ed. M. Bocci et al., "A Framework for MPLS in Transport Networks," Internet Engineering Task Force (IETF), Request Comments: 5921, Jul. 2010, pp. 1-66.
Extended European Search Report and Written Opinion for Application No. 12888111.7, mailed May 12, 2016, 6 pages.

* cited by examiner

| Type of TLV == Multicast Group Configuration on Edge Switch/Router; Length of TLV; |
|---|
| Global Unique ID of the Root |
| Global Unique ID of the Leaf Node |
| Operation (add or delete) |
| Multicast Address 1 and the associated PW |
| Operation (add or delete) |
| Multicast Address 2 and the associated PW |
| Operation (add or delete) |
| Multicast Address 3 and the associated PW |
| Operation (add or delete) |
| Multicast Address 4 and the associated PW |

Fig. 6b

| Type of TLV == Multicast Group Configuration on Transit Node; Length of TLV; |
|---|
| Global Unique ID of the Root |
| Global Unique ID of the Transit Node |
| Operation (add or delete) |
| Outsegment LSP |
| Operation (add or delete) |
| Outsegment LSP |

Fig. 6c

METHOD AND APPARATUS FOR CONFIGURING MULTICAST GROUP

CROSS-REFERENCE TO RELATED APPLICATIONS

This application is a National stage of International Application No. PCT/CN2012/001509, filed Nov. 8, 2012, which is hereby incorporated by reference.

TECHNICAL FIELD

The present technology generally relates to multicast communication, particularly to a method and communication node for configuring multicast group in Multiple Protocol Label Switching (MPLS) network.

BACKGROUND

MPLS is a mechanism in high-performance telecommunications networks that directs data from one network node to the next based on short path labels rather than long network addresses. In an MPLS network, data packets are assigned labels. Packet-forwarding decisions are made solely on the contents of this label. This allows one to create end-to-end virtual circuits across any type of transport medium, using any protocol.

In MPLS network, routers that perform routing based only on the label are called label switch routers (LSRs). The entry and exit points of an MPLS network are called label edge routers (LERs). Labels are distributed between LERs and LSRs using the label signaling mechanisms, such as Label Distribution Protocol (LDP) and Resource Reservation Protocol-Traffic Engineering (RSVP-TE). Label-switched paths (LSPs) are established for a variety of purposes, such as to create the Virtual Private Networks (VPNs) connecting the geographically distributed sites or to route traffic along specified paths.

For a specific MPLS-based VPN, LERs that function as ingress and/or egress routers to the VPN are often called PE (Provider Edge) routers. Devices that function only as transit routers are similarly called P (Provider) routers.

Nowadays, the telecommunication operators increasingly establish MPLS multicast tree to deliver the traffics, such as Internet Protocol Television (IPTV) program, online gaming etc, to the end users. FIG. 1 illustrates the multicast tree for Virtual Private Local Area Network Service (VPLS), which connects the PEs through the point-to-multipoint (P2MP) LSPs. In order to reduce the operating expense and capital expense, the operators prefer the deployment of static MPLS or MPLS-TP in their backhaul networks. Take the static VPLS as example, the local multicast group forwarding table stored in leaf node (e.g. PE2, PE4) need to be configured and updated manually by using the network management system. In particular, the manual configuration is accomplished through the pseudo-wires (PWs) in the full meshed PW network among all the PEs. In addition, it is impossible for the existing solution to configure the local multicast forwarding table in the transit node, i.e. LSRs, due to the use of the PW, because the PW directly wired between the PEs is transparent to the transit nodes. And for the same reasons, the root node (e.g. PE1) needs replicate the multicast group configuration packet for all the leaf nodes and relay to them, which causes the low performance of delivery.

SUMMARY

Therefore, it is a strong desire to solve at least one of the above-mentioned problems.

According to an aspect of the embodiments, there is provided a method for configuring a multicast group by a root node for a multicast tree in a MPLS network. The method comprising: obtaining a multicast group configuration request to configure the local multicast groups of at least one downstream node in the MPLS network, the at least one downstream node may comprise a transit node, a leaf node or the combination thereof; generating a multicast group configuration packet based on the multicast group configuration request; and transmitting the multicast group configuration packet from the root node to the at least one downstream node via a multicast tree in the MPLS network.

According to another aspect of the embodiments, there is provided a communication node configuring a multicast group for a multicast tree in the MPLS network, the communication node functions as a root node in the MPLS network. The communication node comprises an obtaining unit adapted to obtain a multicast group configuration request to configure the local multicast groups of at least one downstream node, the at least one downstream node may comprise a transit node, a leaf node or the combination thereof, a generating unit adapted to generate a multicast group configuration packet based on the multicast group configuration request, and a transmitting unit adapted to transmit the multicast group configuration packet from the root node to the at least one downstream node via a multicast tree in the MPLS network.

According to further aspect of the embodiments, there is provided a computer program product, which comprises the instructions for implementing the steps of the method as described above.

According to still further aspect of the embodiments, there is provided a recording medium which stores instructions for implementing the steps of the method as described above.

It is advantageous to make use of the multicast tree instead of the PWs to configure the multicast group in the transit nodes and/or leaf nodes. Through transmitting the multicast group configuration packet via the multicast tree, both the leaf node and the transit node can be configured, and thus the root node is not required to replicate the multicast group configuration packet for all the leaf nodes any more. Hence, a dynamic and fast multicast group setting on leaf node/transit node is provisioned.

BRIEF DESCRIPTION OF THE DRAWINGS

The technology will now be described, by way of example, based on embodiments with reference to the accompanying drawings, wherein:

FIG. 6b is the format of the multicast group configuration TLV for the leaf node in accordance with an embodiment;

FIG. 6c is the multicast group configuration TLV for the transit node in accordance with an embodiment.

DETAILED DESCRIPTION

Figure 1:
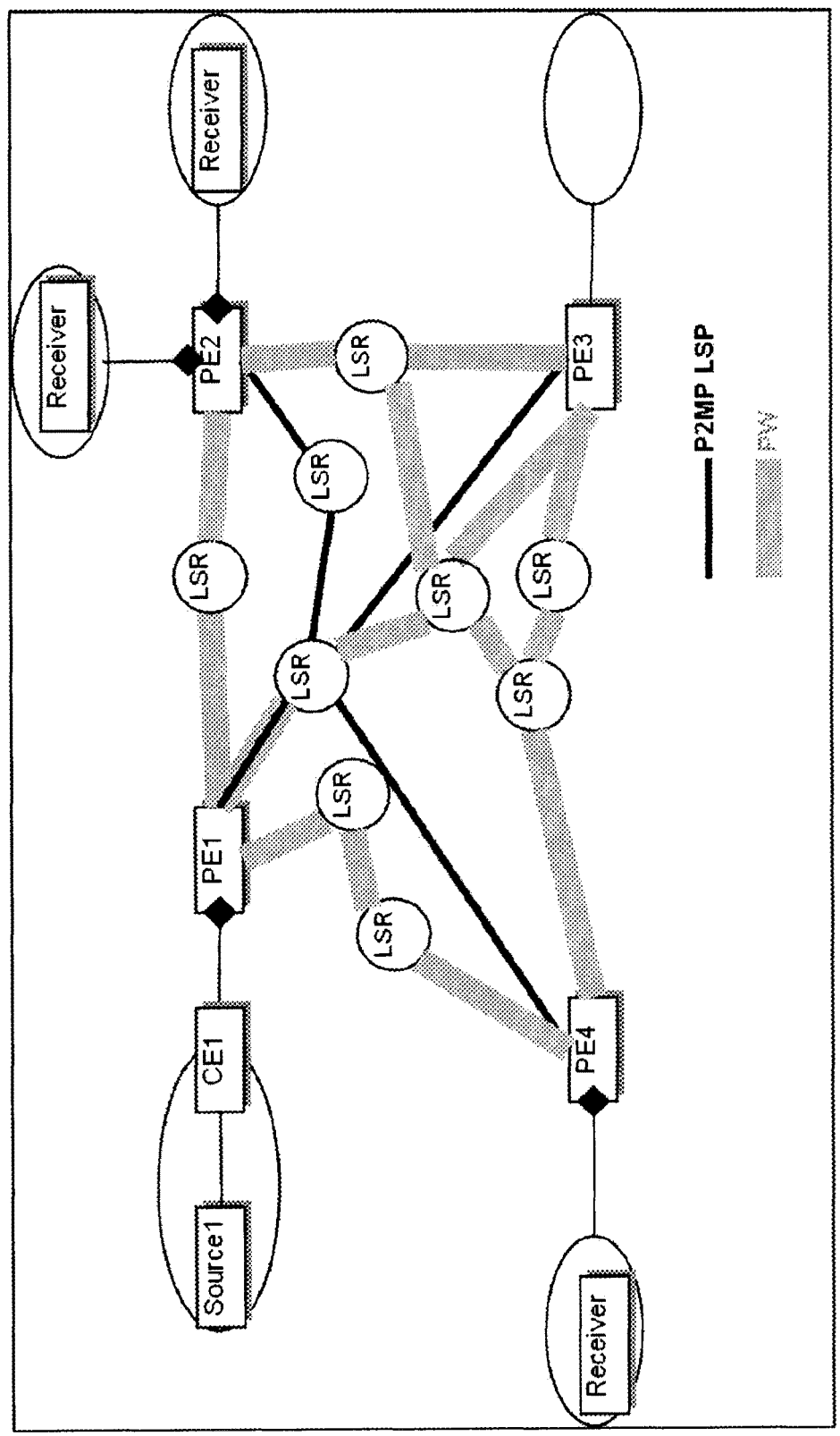
FIG. 1 illustrates a schematic view of the multicast tree in MPLS network.

Embodiments herein will be described more fully hereinafter with reference to the accompanying drawings, in which embodiments are shown. This embodiments herein may, however, be embodied in many different forms and should not be construed as limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Although specific terms in some specifications are used here, such as leaf node, it should be understand that the embodiments are not limited to those specific terms but may be applied to all similar entities, such as leaf router, leaf switch etc. The root node herein can be applicable to the static MPLS, MPLS Transport Profile (MPLS-TP), etc, and the suitable communication protocols/standards developed in the future.

Embodiments herein will be described below with reference to the drawings.

Figure 2:
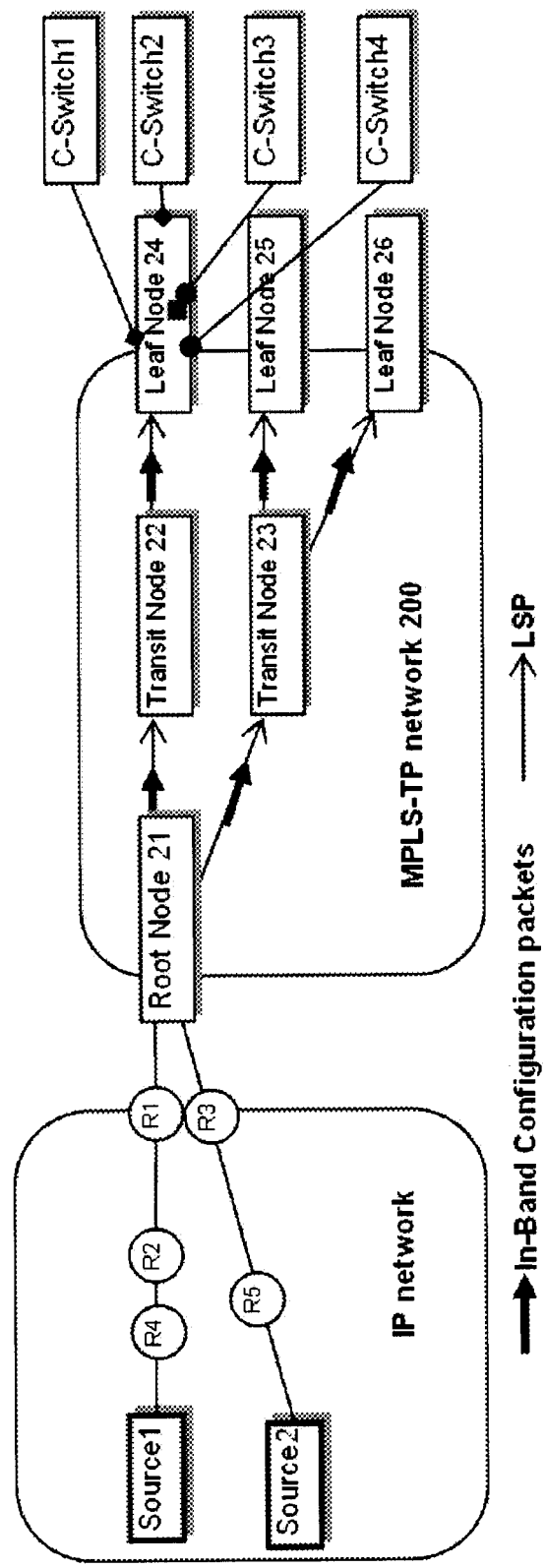
FIG. 2 illustrates a schematic view of a MPLS network environment suitable for implementing an embodiment.

FIG. 2 illustrates a schematic view of a MPLS network environment suitable for implementing an embodiment.

As shown in FIG. 2, the MPLS-TP network 200 comprises the LERs including root node 21, leaf node 24, leaf node 25 and leaf node 26, and the LSRs including transit node 22 and transit node 23. The root node may refer to the LER that connects with the operation source (e.g. IPTV server) or source network (e.g. IP network) outside the MPLS network. The leaf node may refer to the LER that is coupled with one or more customer switches, like C-Switch 1-4, which may further be communicatively connected to the User Equipments (UEs). Here, the connection among the above nodes may be implemented in wired or wireless way, or combination thereof. The term "UE" used herein may indicates all forms of devices enabling the user to communicate via a communication network, such as smart phones, cellular phone, Personal Digital Assistant (PDA), television, set-top box, desktop computer, laptop computer, tablet computer, and the like. Hereinafter, the embodiments will be described in the context of the MPLS-TP. However, such description is only exemplary, rather than restrictive, and the embodiments are also applicable to other types of network, such as static MPLS network, MPLS Layer 2 Virtual Private Network (L2VPN), and MPLS L3VPN.

For simplicity and clarity, only four LERs and two LSRs are shown in the MPLS-TP network, it will be appreciated that one or more LERs and/or LSRs may exist in the MPLS network to participate in the implementation of the method described herein.

Figure 3:
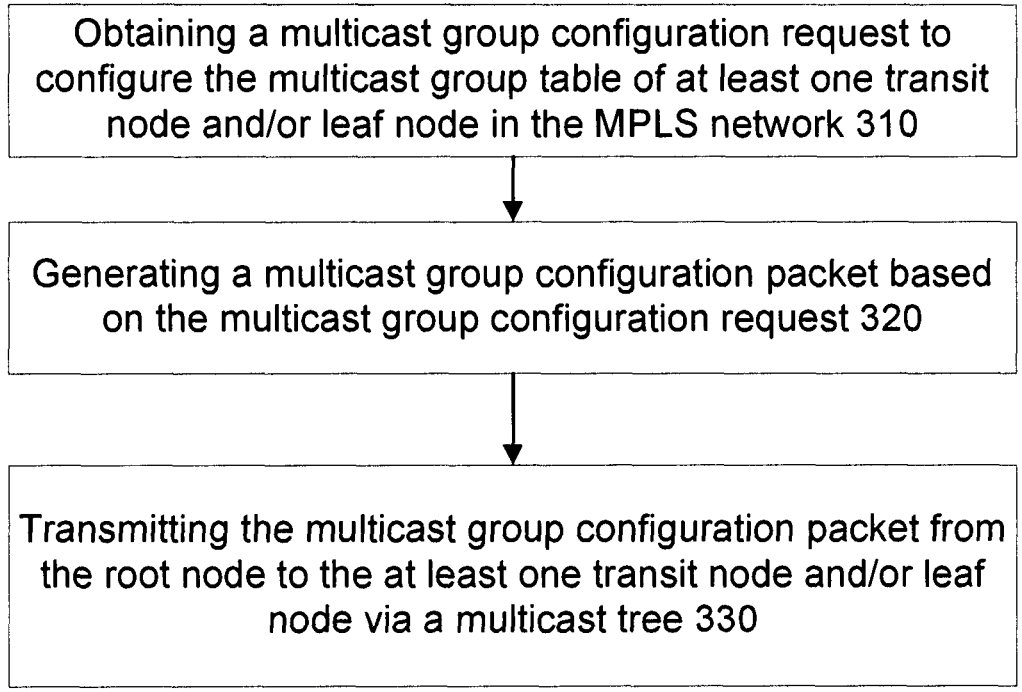
FIG. 3 illustrates a flowchart of configuring a multicast group in the MPLS network in accordance with an embodiment.

FIG. 3 illustrates a flowchart of configuring a multicast group in the MPLS network in accordance with an embodiment.

In step 310, the root node, for example the root node 21, may obtain a multicast group configuration request to configure the multicast group of at least one downstream node in the MPLS network, the at least one downstream node may comprise a transit node, a leaf node or the combination thereof.

Usually, the multicast group is represented in the form of a table, e.g. the local multicast forwarding table. Specifically, there exists the local multicast forwarding table in the transit node and the leaf node, which is utilized to guide the routing/delivery of the multicast stream. For the leaf node, the local multicast forwarding table contains the mapping between the multicast address and the sub-interfaces connecting with the listeners. The sub-interface is used to downstream the multicast traffic identified by that multicast address. For the transit node, the local multicast forwarding table may contain the outsegment LSP, which is used to guide the data downstreaming from the designated multicast address. For example, when receiving the multicast stream from the upstream node, the transit node may determine the outsegment LSPs to which it will replicate and relay the received multicast stream, with reference to the local multicast forwarding table in the transit node. When receiving the multicast stream, the leaf node may determine the customer switches to which it may deliver the multicast stream, by referring to its local multicast forwarding table.

Here, the multicast group configuration request may refer to the configuration request involving specific multicast services in practice. For example, regarding to the cable TV service over the MPLS network, this configuration request may include joining a cable TV program multicast group and quitting the cable TV program multicast group. Regarding to the enterprise conference call over the MPLS VPN, the multicast group configuration request may include allowing the designated participants join the multicast group associated with this conference call. Furthermore, a multicast group configuration request may be directed to multiple transit nodes and/or leaf nodes simultaneously instead of merely one node. For example, the multicast group configuration request may involve allowing a number of UEs communicatively connected to different leaf nodes to join a multicast group like an IPTV channel. Note that for purpose of the management or security, the authentication mechanisms may be incorporated in the services mentioned above.

The root node may obtain the multicast group configuration request from the operation source (e.g. source 1 or source 2 as illustrated in FIG. 2) communicatively coupled with the root node. The operation source may refer to the service core of the telecommunication operators, including the authentication server, portable server, Information Management System (IMS) server, electronic program guide server, etc. For example, the multicast group configuration request involves disqualifying some UEs from joining a multicast group.

Alternatively, the root node may also obtain the multicast group configuration request transmitted from the leaf node by for example Internet Group Message Protocol (IGMP) report message or Protocol Independent Multicast (PIM) join message, which will be described in more detail later.

It should be appreciated that the above ways to obtain multicast group configuration request are described by way of example, and any other suitable ways can be used in this embodiment.

In step 320, the root node, for example the root node 21, may generate a multicast group configuration packet based on the multicast group configuration request. Specifically, after the root node obtains the multicast group configuration request, it will determine the transit nodes/leaf nodes whose local multicast forwarding table needs to be updated due to the request, and accordingly generate the multicast group configuration packet directed to them. For example, as illustrated in FIG. 2, provided that the multicast group configuration request is sent from the C-Switch 1, which is intended to subscribe multicast service, such as a cable TV program. In accordance with the multicast group configuration request, the root node may determine that the local multicast forwarding table in the leaf node 24 adjacent to C-Switch 1 needs to be updated, such that the multicast stream corresponding to the cable TV program can be delivered to C-Switch 1, which may further relay the multicast stream to the corresponding UEs. Consequently, the root node generates the multicast group configuration packet according to the determination.

For a multicast group configuration packet targeted for a specific transit node, it may include the pair of outsegment LSP and operation command, for example, indicating add/remove the outsegment LSP, which can be in the form of the multicast group configuration TLV as illustrated in FIG. 6c. Here, adding the outsegment LSP to the local multicast forwarding table means allowing the incoming multicast stream to be propagated along the corresponding LSP, while removing the outsegment LSP from the local multicast forwarding table means prohibiting the incoming multicast stream from the propagation along the corresponding LSP.

For a multicast group configuration packet reaching the leaf node, it may include the pair of multicast address and operation command, for example, indicating add/remove the multicast address, which can be in the form of the multicast group configuration TLV as illustrated in FIG. 6b. Here, adding the multicast address to the local multicast forwarding table means adding the mapping of the multicast address and the corresponding sub-interface through which the multicast group configuration request encapsulated with IMGP report message/PIM join message is received. In this way, the multicast stream from the multicast address will flow through the sub-interface and finally arrive at the UEs that initiate the request for multicast services. By contrast, removing the multicast address means remove the mapping of the multicast address and the corresponding sub-interface from the local multicast forwarding table. As a result, the multicast stream identified by that address will not be delivered to the sub-interface.

In step 330, the root node, for example the root node 21, may transmit the multicast group configuration packet from the root node to the corresponding transits node and/or leaf nodes via a multicast tree. Here, the multicast tree has been established in the MPLS network in advance. It can deliver both the multicast data (e.g. cable TV program multicast stream) and the control packets (e.g. the multicast group configuration packet and the continuity check packets). The leaf node/transit node may distinguish the control packets from the data traffic by examining the control word of the packet. For example, the packet is in the format of [tunnel LSP label] [pw label][control-word][multicast data] . . . , for a multicast data packet, the first four bits of "control word" is '0000', while for a control packet, the first four bits is '0001'.

Figure 6A:
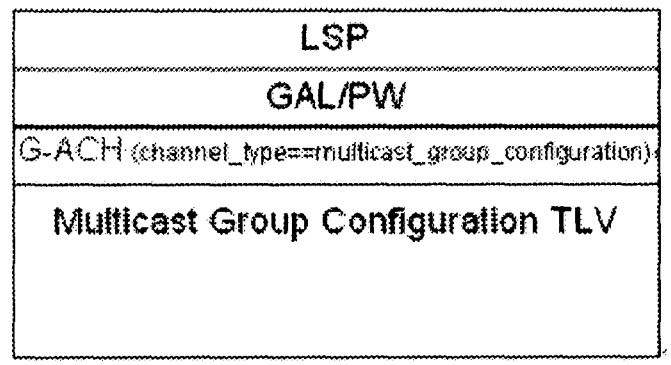
FIG. 6a is the format of the multicast group configuration packet in accordance with an embodiment.

Alternatively, the multicast group configuration packet can be transmitted over a MPLS Generic Associated Channel (G-ACH) via the multicast tree. As such, the format of the multicast group configuration packet is illustrated in FIG. 6a. As shown in FIG. 6a, a new channel type is defined as MULTICAST_GROUP_CONFIGURATION, G-ACH Label (GAL) is used as an exception mechanism to make sure that the packet will be processed by the receiving transit node/leaf node, and it contains the multicast group configuration TLV as described above. Note that MPLS G-ACH is known to the art, for purpose of simplicity, the discussion of MPLS G-ACH will not be described in more detail here.

Through transmitting the multicast group configuration packet via the multicast tree, both the leaf node and the transit node can be configured, meanwhile instead of replicating the multicast group configuration packet for all the leaf nodes any more, the root node merely replicates and relays the multicast group configuration packet to its immediately downstream nodes in the multicast tree. Accordingly, a dynamic and fast multicast group setting on leaf node/transit node is provisioned.

Optionally, in order to deliver the multicast group configuration packet to a specific transit node over a LSP owning multiple nodes, a corresponding Time-To-Live, TTL, value can be set in the multicast group configuration packet. For example, as shown in FIG. 2, if the multicast group configuration packet is directed to the transit node 23 to stop the replication of the multicast stream to the leaf node 26, the multicast group configuration packet can be set with the LSP TTL of 1 from the root node 21. During the transmission, the multicast group configuration packet reaches the transit node 23 and the TTL expires by the TTL value minus 1, therefore the transit node 23 updates its local multicast group forwarding table with the multicast group configuration packet.

Now the root node obtaining the multicast group configuration request from the leaf node will be discussed with reference to FIG. 4.

Figure 5A:
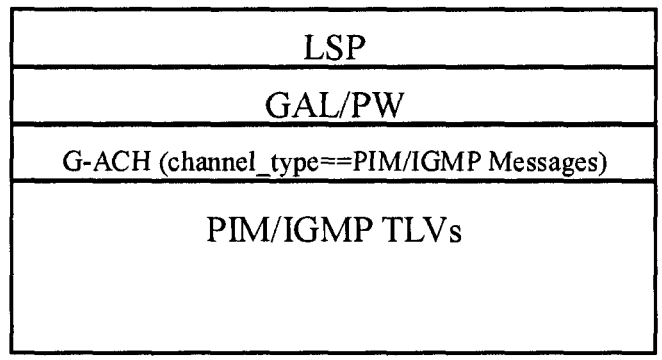
FIG. 5a is the format of the in-band PIM/IGMP message in accordance with an embodiment.
Figure 5B:
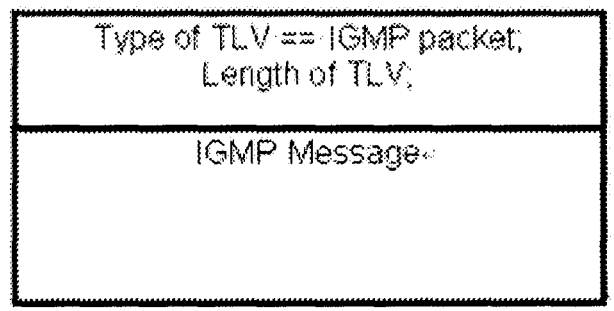
FIG. 5b is the format of in-band IGMP Type-length-value (TLV) in accordance with an embodiment.

The root node, for example the root node 41, may receive an in-band layer 2 (data link layer) or layer 3 (network layer) protocol message from the leaf node through an associated channel (e.g. MPLS G-ACH) over a PW connecting the root node with the leaf node, and then process the message to obtain the multicast group configuration request. Here, the layer 2 protocol message may comprise, but not limited to, the IGMP report message for IPv4 and Multicast Listener Discovery, MLD, report message for IPv6. The layer 3 protocol message may comprise, but not limited to, the Protocol Independent Multicast, PIM, join message. For example, an end user wants to subscribe a cable TV program and sets the subscription through the user interface of the set-top box coupled with a television; thereby the set-top box creates an IGMP message encapsulating the subscription as illustrated in FIG. 5b and reports the IGMP message to the customer switch, which further sends the IGMP message to its coupling leaf node in the MPLS-TP network. Subsequently, the leaf node may encapsulate the IGMP message so as to be transmitted to the root node through an associated channel (e.g. MPLS G-ACH) over a PW connecting the root node with the leaf node, as illustrated in FIG. 5a. After receiving the encapsulated IGMP message, the root node may parse it, and accordingly obtain the multicast group configuration request, for example, applying for the delivery of the corresponding cable TV program multicast stream to the end user.

Figure 4:
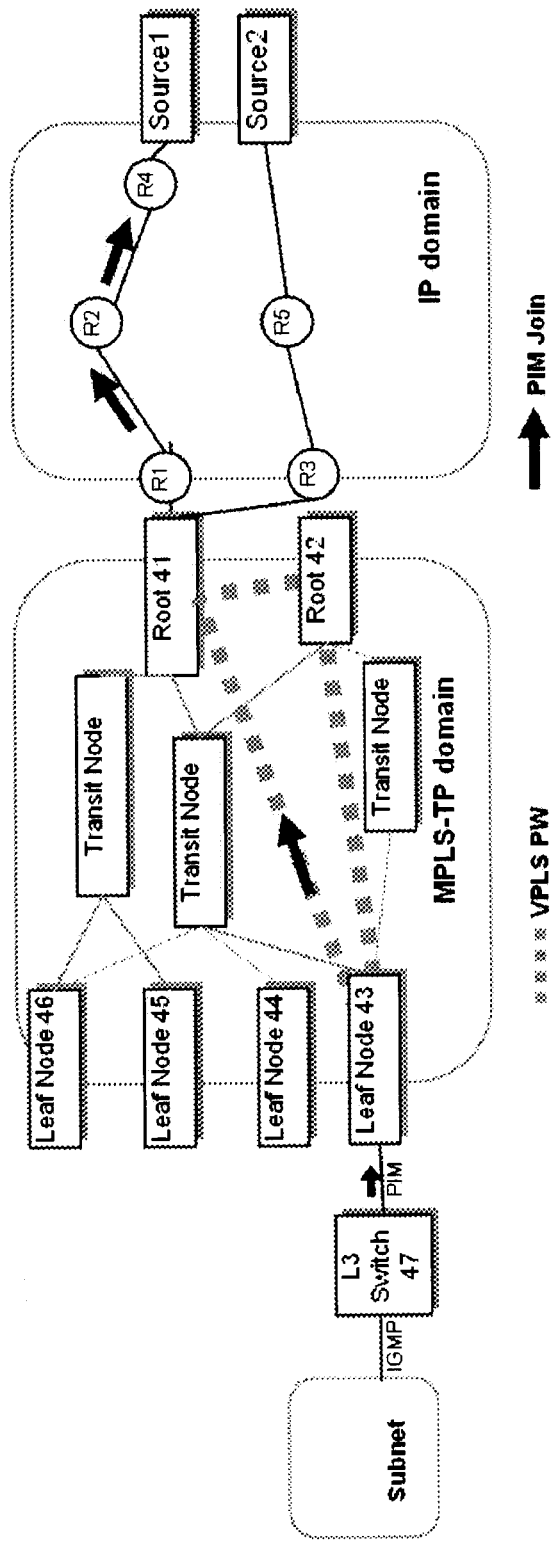
FIG. 4 illustrates the transmission of in-band Protocol Independent Multicast (PIM) join message from the leaf node to the root node in accordance with an embodiment.

Alternatively, in the above example, if the customer switch is a layer 3 switch such as the L3 switch 47 in FIG. 4, it may convert the received layer 2 IGMP message into the layer 3 PIM message, and send the PIM message to the upstream routers through the MPLS-TP network. In the traversal through the MPLS-TP network, the PIM message is transmitted over an associated channel, e.g. MPLS G-ACH, which is bounded with a PW directly connecting the leaf node (e.g. leaf node 43) with the root node (e.g. root node 41), and then the root node may process the PIM message according to the layer 3 PIM protocol to obtain the multicast group configuration request. Note that most of the existing MPLS networks merely implement the layer 2 protocols, in other words, the communication nodes in the MPLS network, including the leaf node, root node and transit node, only can process the layer 2 protocol message, such as IGMP message, and lacks in the capability to deal with the layer 3 protocol message, such as PIM message. In this case, due to the use of PW directly connecting the leaf node and the root node, it is minimized to require the communication nodes support layer 3 protocols so as to transmit the layer 3 message in the MPLS-TP network. For example, in order for the PIM message transmission in the MPLS-TP network as illustrated in the FIG. 4, only the leaf node 43 and the root node 41, rather than more communication nodes like the transit nodes, need to implement the support of layer 3 protocols.

Alternatively, after receiving the layer 2 or layer 3 protocol messages from the leaf node, the root node may transmit the message to a related operation source for verifying the validity of the message and/or approval of the service request, receive a feedback from the operation source in response to the message, and then compose the multicast group configuration request according to the feedback. For example, as illustrated in FIG. 4, when receiving the PIM join message to subscribe a cable TV program from the leaf node 43, the root node 41 transmit the PIM join message to the IMS server (e.g. source 1) of the cable TV provider, which is responsible for verifying the validity of the message, such as whether the subscriber being in the blacklist. If the IMS server finds that the subscriber has owed the fee, then it will feedback that the message is invalid, and request disqualify the subscriber from joining the cable TV multicast group. As such, the root node 41 will instead compose a multicast group configuration request to disqualify the subscriber, i.e. prohibiting all the multicast streams originating from such cable TV provider from delivering to this subscriber.

Figure 7:
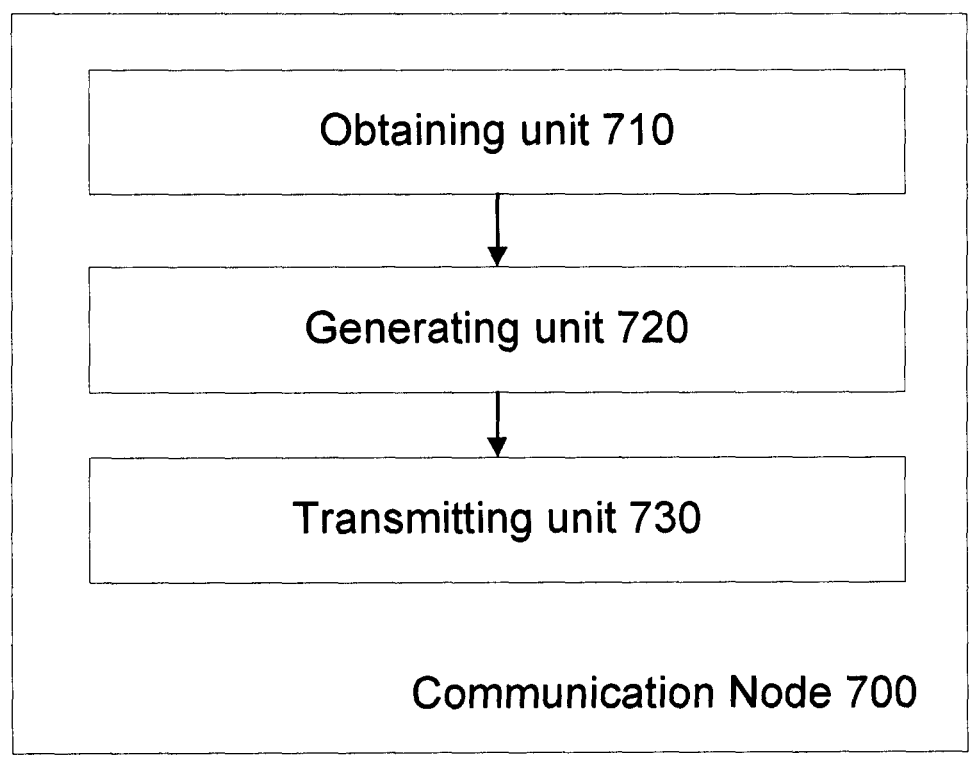
FIG. 7 is the block diagram of the communication node used to configure the multicast group in the MPLS network in accordance with an embodiment.

FIG. 7 is the block diagram of the communication node used to configure the multicast group in the MPLS network in accordance with an embodiment.

As illustrated in the FIG. 7, the communication node 700 may comprise the obtaining unit 710, generating unit 720 and transmitting unit 730. It should be appreciated that the communication node is not limited to the shown elements, and can comprise other conventional elements and the additional elements implemented for other purposes. Here, the communication node 700 may function as the root node 21 in FIG. 2, the root node 41 in FIG. 4. Now the functionality of communication node 700 will now be described with reference to the FIG. 2, FIG. 4 and FIG. 7.

The obtaining unit 710 in the root node may obtain a multicast group configuration request, which is to configure the multicast group of at least one downstream node in the MPLS network, the at least one downstream node may comprise a transit node, a leaf node or the combination thereof.

Usually, the multicast group is represented in the form of a table, e.g. the local multicast forwarding table. Specifically, there exists the local multicast forwarding table in the transit node and the leaf node, which is utilized to guide the routing/delivery of the multicast stream. For the leaf node, the local multicast forwarding table contains the mapping between the multicast address and the sub-interfaces connecting with the listeners. The sub-interface is used to downstream the multicast traffic identified by that multicast address. For the transit node, the local multicast forwarding table may contain the outsegment LSP, which is used to guide the data downstreaming from the designated multicast address. For example, when receiving the multicast stream from the upstream node, the transit node may determine the outsegment LSPs to which it will replicate and relay the received multicast stream, with reference to the local multicast forwarding table in the transit node. When receiving the multicast stream, the leaf node may determine the customer switches to which it may deliver the multicast stream, by referring to its local multicast forwarding table.

Here, the multicast group configuration request may refer to the configuration request involving specific multicast services in practice. For example, regarding to the cable TV service over the MPLS network, this configuration request may include joining a cable TV program multicast group and quitting the cable TV program multicast group. Regarding to the enterprise conference call over the MPLS VPN, the multicast group configuration request may include allowing the designated participants join the multicast group associated with this conference call. Furthermore, a multicast group configuration request may be directed to multiple transit nodes and/or leaf nodes simultaneously instead of merely one node. For example, the multicast group configuration request may involve allowing a number of UEs communicatively connected to different leaf nodes to join a multicast group like an IPTV channel. Note that for purpose of the management or security, the authentication mechanisms may be involved in the services mentioned above.

The obtaining unit 710 in the root node may obtain the multicast group configuration request from the operation source (e.g. source 1 or source 2 as illustrated in FIG. 2) communicatively coupled with the root node. The operation source may refer to the service core of the telecommunication operators, including the authentication server, portable server, Information Management System (IMS) server, electronic program guide server, etc. For example, the multicast group configuration request involves disqualifying some UEs from joining a multicast group.

Alternatively, The obtaining unit 710 may also obtain the multicast group configuration request transmitted from the leaf node by, for example, Internet Group Message Protocol (IGMP) report message or Protocol Independent Multicast (PIM) join message, which will be described in more detail later.

It should be appreciated that the above ways to obtain multicast group configuration request are described by way of example, and any other suitable ways can be used in this embodiment.

Next, the generating unit 720 in the root node may generate a multicast group configuration packet based on the multicast group configuration request. Specifically, after the obtaining unit 710 obtains the multicast group configuration request, the generating unit 720 will determine the transit nodes/leaf nodes whose local multicast forwarding table needs to be updated due to the request, and accordingly generate the multicast group configuration packet directed to them. For example, as illustrated in FIG. 2, provided that the multicast group configuration request is sent from the C-Switch 1, which is intended to subscribe multicast service, such as a cable TV program. In accordance with the multicast group configuration request, the generating unit 720 may determine that the local multicast forwarding table in the leaf node 24 adjacent to C-Switch 1 needs to be updated, such that the multicast stream corresponding to the cable TV program can be delivered to C-Switch 1, which may further relay the multicast stream to the corresponding UEs. Consequently, the generating unit 720 generates the multicast group configuration packet according to the determination.

For a multicast group configuration packet targeted for a specific transit node, it may include the pair of outsegment LSP and operation command, for example, indicating add/remove the outsegment LSP, which can be in the form of the multicast group configuration TLV as illustrated in FIG. 6c. Here, adding the outsegment LSP to the local multicast forwarding table means allowing the incoming multicast stream to be propagated along the corresponding LSP, while removing the outsegment LSP from the local multicast forwarding table means prohibiting the incoming multicast stream from the propagation along the corresponding LSP.

For a multicast group configuration packet delivered to the leaf node, it may include the pair of multicast address and operation command, for example, indicating add/remove the multicast address, which can be in the form of the multicast group configuration TLV as illustrated in FIG. 6b. Here, adding the multicast address to the local multicast forwarding table means adding the mapping of the multicast address and the corresponding sub-interface through which the multicast group configuration request encapsulated with IMGP report message/PIM join message is received. In this way, the multicast stream from the multicast address will flow through the sub-interface and finally arrive at the UEs that initiate the request for multicast services. By contrast, removing the multicast address means remove the mapping of the multicast address and the corresponding sub-interface from the local multicast forwarding table. As a result, the multicast stream identified by that address will not be delivered to the sub-interface.

Subsequently, the transmitting unit 730 in the root node may transmit the multicast group configuration packet from the root node to the corresponding transits node and/or leaf nodes via a multicast tree. Here, the multicast tree has been established in the MPLS network in advance. It can deliver both the multicast data (e.g. cable TV program multicast stream) and the control packets (e.g. the multicast group configuration packet and the continuity check packets). The leaf node/transit node may distinguish the control packets from the data traffic by examining the control word of the packet. For example, the packet is in the format of [tunnel LSP label][pw label][control-word][multicast data] . . . , for a multicast data packet, the first four bits of "control word" is '0000', while for a control packet, the first four bits is '0001'.

Alternatively, the multicast group configuration packet can be transmitted over a MPLS Generic Associated Channel (G-ACH) via the multicast tree. As such, the format of the multicast group configuration packet is illustrated in FIG. 6a. As shown in FIG. 6a, a new channel type is defined as MULTICAST_GROUP_CONFIGURATION, G-ACH Label (GAL) is used as a echanism to make sure that the packet will be processed by the receiving transit node/leaf node, and it contains the multicast group configuration TLV as described above. Note that MPLS G-ACH is known to the art, for purpose of simplicity, the discussion of MPLS G-ACH will not be described in more detail here.

Through transmitting the multicast group configuration packet via the multicast tree, both the leaf node and the transit node can be configured, meanwhile instead of replicating the multicast group configuration packet for all the leaf nodes any more, the root node merely replicates and relays the multicast group configuration packet to its immediately downstream nodes in the multicast tree. Accordingly, a dynamic and fast multicast group setting on leaf node/transit node is provisioned.

Optionally, in order to deliver the multicast group configuration packet to a specific transit node over a LSP owning multiple nodes, a corresponding Time-To-Live, TTL, value can be set in the multicast group configuration packet. For example, as shown in FIG. 2, if the multicast group configuration packet is directed to the transit node 23 to stop the replication of the multicast stream to the leaf node 26, the generating unit 720 can set the multicast group configuration packet with the LSP TTL of 1 starting from the root node. In the course of transmission, TTL expires when the multicast configuration packet is being handled by the transit node 23, therefore the transit node 23 updates its local multicast group forwarding table with the multicast group configuration packet.

Now the obtaining unit 710 obtaining the multicast group configuration request from the leaf node will be discussed with reference to FIG. 4.

The receiving unit (not shown) in the obtaining unit 710 may receive an in-band layer 2 (data link layer) or layer 3 (network layer) protocol message from the leaf node over a MPLS G-ACH associated with a PW connecting the root node and the leaf node, and then the processing unit (not shown) in the obtaining unit 710 may process the message to obtain the multicast group configuration request. Here, the layer 2 protocol message may comprise, but not limited to, the IGMP report message for IPv4 and Multicast Listener Discovery, MLD, report message for IPv6. The layer 3 protocol message may comprise, but not limited to, the Protocol Independent Multicast, PIM, join message. For example, an end user wants to subscribe a cable TV program and sets the subscription through the user interface of the set-top box coupled with a television; thereby the set-top box creates an IGMP message encapsulating the subscription as illustrated in FIG. 5b and reports the IGMP message to the customer switch, which further sends the IGMP message to its coupling leaf node in the MPLS-TP network. Subsequently, the leaf node may encapsulate the IGMP message so as to be transmitted to the root node through an associated channel (e.g. MPLS G-ACH) over a PW connecting the root node with the leaf node, as illustrated in FIG. 5a. After receiving the encapsulated IGMP message, the processing unit may parse it, and accordingly obtain the multicast group configuration request, for example, applying for the delivery of the corresponding cable TV program multicast stream to the end user.

Alternatively, in the above example, if the customer switch is a layer 3 switch such as the L3 switch 47 in FIG. 4, it may convert the received layer 2 IGMP message into the layer 3 PIM message, and send the PIM message to the upstream routers through the MPLS-TP network. In the traversal through MPLS-TP network, the PIM message is transmitted over an associated channel, e.g. MPLS G-ACH, which is bounded with a PW directly connecting the leaf node (e.g. leaf node 43) with the root node (e.g. root node 41), and then the processing unit in the obtaining unit 710 of the root node may process the PIM message according to the layer 3 PIM protocol to obtain the multicast group configuration request. Note that most of the existing MPLS networks merely implement the layer 2 protocols, in other words, the communication nodes in the MPLS network, including the leaf node, root node and transit node, only can process the layer 2 protocol message, such as IGMP message, and lacks in the capability to deal with the layer 3 protocol message, such as PIM message. In this case, due to the use of PW directly connecting the leaf node and the root node, it is minimized to require the communication nodes support layer 3 protocols so as to transmit the layer 3 message in the MPLS-TP network. For example, in order for the PIM message transmission in the MPLS-TP network as illustrated in the FIG. 4, only the leaf node 43 and the root node 41, rather than more communication nodes like the transit nodes, need to implement the support of layer 3 protocols.

Alternatively, after the receiving unit in the obtaining unit 710 has received the layer 2 or layer 3 protocol messages from the leaf node, the processing unit in the obtaining unit 710 may transmit the message to a related operation source for verifying the validity of the message and/or approval of the service request, receive a feedback from the operation source in response to the message, and then compose the multicast group configuration request according to the feedback. For example, as illustrated in FIG. 4, when receiving the PIM join message to subscribe a cable TV program from the leaf node 43, the processing unit of the root node 41 transmit the PIM join message to the IMS server (e.g. source 1) of the cable TV provider, which is responsible for verifying the validity of the message, such as whether the subscriber being in the blacklist. If the IMS server finds that the subscriber has owed the fee, then it will feedback that the message is invalid, and request disqualify the subscriber from joining the cable TV multicast group. As such, the processing unit will instead compose a multicast group configuration request to disqualify the subscriber, i.e. prohibiting all the multicast streams originating from such cable TV provider from delivering to this subscriber.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for configuring a multicast group by a root node in a Multiple Protocol Label Switching (MPLS) network, comprising:
obtaining a multicast group configuration request to configure the multicast group of at least one downstream node that is a transit node coupled to a leaf node, wherein the obtaining comprises:
receiving a message from the at least one downstream node;
transmitting the message to an operation source for verifying validity of the message;
receiving a feedback from the operation source in response to the message; and
composing the multicast group configuration request according to the feedback;
generating a multicast group configuration packet based on the multicast group configuration request; and
transmitting the multicast group configuration packet from the root node to the transit node via a multicast tree in the MPLS network, wherein the transit node uses an outsegment Label Switched Path (LSP) label included in the multicast group configuration packet to replicate a received multicast stream.

2. The method according to claim 1, wherein the transmitting comprises:
transmitting the multicast group configuration packet from the root node to the at least one downstream node over a MPLS Generic Associated Channel (MPLS G-ACH) via the multicast tree in the MPLS network.

3. The method according to claim 1, wherein the multicast group configuration packet is directed to the transit node by setting a corresponding Time-To-Live (TTL) value in the multicast group configuration packet.

4. A communication node configuring a multicast group in a Multiple Protocol Label Switching (MPLS) network, the communication node functions as a root node in the MPLS network, comprising:
a processor; and
a non-transitory computer readable storage medium with computer program instructions stored thereon which when executed by said processor cause the communication node to:
obtain a multicast group configuration request to configure the multicast group of at least one downstream node that is a transit node coupled to a leaf node, wherein obtaining the multicast group configuration request includes to:
receive a message from the at least one downstream node, transmit the message to an operation source for verifying validity of the message,
receive a feedback from the operation source in response to the message, and
compose the multicast group configuration request according to the feedback;
generate a multicast group configuration packet based on the multicast group configuration request; and
transmit the multicast group configuration packet from the root node to the transit node via a multicast tree in the MPLS network, wherein the transit node uses an outsegment Label Switched Path (LSP) label included in the multicast group configuration packet to replicate a received multicast stream.

5. The communication node according to claim 4, wherein to transmit comprises to transmit the multicast group configuration packet from the root node to the at least one downstream node over a MPLS Generic Associated Channel (MPLS G-ACH) via the multicast tree in the MPLS network.

6. The communication node according to claim 4, wherein to generate comprises to generate the multicast group configuration packet being directed to the transit node by setting a corresponding Time-To-Live (TTL) value in the multicast group configuration packet.

7. The communication node of claim 4, wherein the multicast group configuration packet contains a control word that differentiates the multicast group configuration packet from data traffic.

8. The communication node of claim 4, wherein the at least one pair of outsegment LSP label and operation command indicates adding or removing the outsegment LSP label.

9. The communication node of claim 4, wherein multicast group configuration packet includes type-length-value (TLV) fields.

10. A non-transitory computer readable storage medium which stores computer code instructions which when executed by a processor cause the processor to perform:
obtaining a multicast group configuration request to configure a multicast group of at least one downstream node that is a transit node coupled to a leaf node in a Multiple Protocol Label Switching (MPLS) network, wherein the obtaining comprises:
receiving a message from the at least one downstream node;
transmitting the message to an operation source for verifying validity of the message;
receiving a feedback from the operation source in response to the message; and
composing the multicast group configuration request according to the feedback;
generating a multicast group configuration packet based on the multicast group configuration request; and
transmitting the multicast group configuration packet from a root node in the MPLS network to the transit node via a multicast tree in the MPLS network, wherein the transit node uses an outsegment Label Switched Path (LSP) label included in the multicast group configuration packet to replicate a received multicast stream.

11. The non-transitory computer readable storage medium of claim 10, wherein the transmitting comprises:
transmitting the multicast group configuration packet from the root node to the at least one downstream node over a Generic Associated Channel (MPLS G-ACH) via the multicast tree in the MPLS network.

12. The non-transitory computer readable storage medium of claim 10, wherein the multicast group configuration packet is directed to the transit node by setting a corresponding Time-To-Live (TTL) value in the multicast group configuration packet.

* * * * *